US012334007B2

(12) United States Patent
Im et al.

(10) Patent No.: US 12,334,007 B2
(45) Date of Patent: Jun. 17, 2025

(54) DISPLAY DEVICE AND METHOD OF DRIVING THE SAME

(71) Applicant: Samsung Display Co., LTD., Yongin-si (KR)

(72) Inventors: Tae Gon Im, Yongin-si (KR); Soo Yeon Kim, Yongin-si (KR); Jong Jae Lee, Yongin-si (KR); Dae Gwang Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/890,097

(22) Filed: Aug. 17, 2022

(65) Prior Publication Data

US 2023/0055768 A1 Feb. 23, 2023

(30) Foreign Application Priority Data

Aug. 18, 2021 (KR) ........................ 10-2021-0109083

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 7,183,582 B2 | 2/2007 | Imamura | | |
| 8,294,696 B2 | 10/2012 | Min et al. | | |
| 8,922,464 B2 | 12/2014 | Inoue et al. | | |
| 9,111,491 B2 | 8/2015 | Woo et al. | | |
| 10,217,392 B2 | 2/2019 | Yu et al. | | |
| 10,297,192 B2 | 5/2019 | Lee et al. | | |
| 10,964,274 B2 | 3/2021 | Kang | | |
| 11,145,244 B2 | 10/2021 | Ban et al. | | |
| 2010/0123649 A1* | 5/2010 | Hamer | G09G 3/3225 | 345/76 |
| 2013/0162620 A1* | 6/2013 | Kim | G09G 3/3233 | 345/212 |
| 2017/0154573 A1* | 6/2017 | Woo | G09G 3/3266 | |

(Continued)

FOREIGN PATENT DOCUMENTS

| | | |
|---|---|---|
| KR | 10-2010-0034561 A | 4/2010 |
| KR | 10-2015-0136052 A | 12/2015 |

(Continued)

*Primary Examiner* — Benjamin X Casarez
(74) *Attorney, Agent, or Firm* — Womble Bond Dickinson (US) LLP

(57) ABSTRACT

A display device includes: a plurality of pixels coupled to data lines and sensing lines; a data driver configured to supply one of an image data signal and a sensing data signal to the data lines; a voltage supply configured to supply an initialization voltage to the pixels through the sensing lines; and a sensing circuit configured to receive a sensing value from at least one of the pixels through the sensing lines, and compare the sensing value with a sensing reference value to generate a sensing voltage control signal to control at least one of the sensing data signal or the initialization voltage.

20 Claims, 9 Drawing Sheets

(56) References Cited

U.S. PATENT DOCUMENTS

| | | | | |
|---|---|---|---|---|
| 2018/0096649 | A1* | 4/2018 | Lee | G09G 3/3233 |
| 2018/0190192 | A1* | 7/2018 | Kwon | G09G 3/3275 |
| 2019/0066578 | A1* | 2/2019 | Chen | G09G 3/3233 |
| 2019/0114972 | A1* | 4/2019 | Feng | H10K 59/12 |
| 2019/0280014 | A1 | 9/2019 | Umezaki et al. | |
| 2020/0020278 | A1* | 1/2020 | Lee | G09G 3/3275 |
| 2020/0302868 | A1* | 9/2020 | Kim | G09G 3/3233 |
| 2021/0056890 | A1* | 2/2021 | Kim | G09G 3/32 |
| 2021/0134214 | A1* | 5/2021 | Ban | G09G 3/32 |
| 2023/0042060 | A1* | 2/2023 | Wang | G09G 3/3258 |

FOREIGN PATENT DOCUMENTS

| | | | |
|---|---|---|---|
| KR | 10-2018-0036200 | A | 4/2018 |
| KR | 10-1854109 | B1 | 5/2018 |
| KR | 10-2027169 | B1 | 10/2019 |
| KR | 10-2020-0053785 | A | 5/2020 |
| KR | 10-2021-0052713 | A | 5/2021 |
| WO | 03/100753 | A1 | 12/2003 |

* cited by examiner

DISPLAY DEVICE AND METHOD OF DRIVING THE SAME

CROSS-REFERENCE TO RELATED APPLICATION

This application claims priority to and the benefit of Korean patent application number 10-2021-0109083 filed on Aug. 18, 2021, the entire disclosure of which is incorporated herein by reference.

BACKGROUND

1. Field

Aspects of some embodiments of the present disclosure relate to a display device and a method of driving the display device.

2. Related Art

Amid growing interest in information display and heightened demand for using portable information media, a great emphasis has been placed on requirements and commercialization of display devices.

Display devices may display images using pixels coupled to a plurality of scan lines and data lines. For this, each pixel may include at least a light-emitting element and a driving transistor.

The driving transistor controls an amount of current applied to the light-emitting element according to a data signal provided from the data line. The light-emitting element produces light of a certain brightness corresponding to the amount of current applied from the driving transistor.

In order for the display device to display images having a relatively uniform quality, the driving transistor included in each of the pixels needs to supply a uniform current corresponding to the data signal to the light-emitting element. However, the driving transistors each included in a pixel have characteristic values that may have deviations.

Hence, there is a need to compensate the data signal supplied to the pixels by detecting the deviation of the driving transistor included in each pixel.

The above information disclosed in this Background section is only for enhancement of understanding of the background and therefore the information discussed in this Background section does not necessarily constitute prior art.

SUMMARY

Aspects of some embodiments of the present disclosure relate to a display device and a method of driving the display device, and for example, to a display device to which an external compensation method is applied and a method of driving the display device.

Some embodiments include a display device and a method of driving the display device to secure a sensing voltage range in which to detect a sensing value.

Aspects of some embodiments may include a display device driven to have a display period for displaying an image and a sensing period for sensing characteristics of a driving transistor. The display device may include pixels coupled to data lines and sensing lines; a data driver configured to supply one of an image data signal and a sensing data signal to the data lines; a voltage supply configured to supply an initialization voltage to the pixels through the sensing lines; and a sensing circuit configured to receive a sensing value from at least one of the pixels through the sensing lines, and compare the sensing value with a sensing reference value to generate a sensing voltage control signal to control at least one of the sensing data signal or the initialization voltage.

According to some embodiments, the sensing circuit may include an analog-to-digital converter coupled to the sensing lines and configured to convert an analog sensing value provided through an input terminal to a digital sensing code.

According to some embodiments, the sensing circuit may further include a voltage comparator coupled to the input terminal of the analog-to-digital converter for comparing the analog sensing value with a sensing reference voltage to generate the sensing voltage control signal.

According to some embodiments, the voltage comparator may generate a first sensing voltage control signal when the analog sensing value is greater than the sensing reference voltage, and generate a second sensing voltage control signal when the analog sensing value is less than the sensing reference voltage.

According to some embodiments, the display device may further include a code comparator configured to receive the digital sensing code, and compare the digital sensing code with a maximum sensing code or a minimum sensing code to generate the sensing voltage control signal based on value of the comparing.

According to some embodiments, the code comparator may generate a first sensing voltage control signal when a value of the comparing between the digital sensing code and the maximum sensing code is less than a preset reference range, and generate a second sensing voltage control signal when a value of the comparing between the digital sensing code and the minimum sensing code is less than a preset reference range.

According to some embodiments, the display device may further include a timing controller configured to generate compensated image data by reflecting the digital sensing code in input image data, and provide the compensated image data to the data driver.

According to some embodiments, the code comparator may compare the digital sensing code with the maximum sensing code or the minimum sensing code, and when the value of the comparing is out of a preset reference range, provide the digital sensing code to the timing controller.

According to some embodiments, the timing controller may receive the sensing voltage control signal, supply a signal to change the sensing data signal to the data driver based on the sensing voltage control signal, and supply a signal to change the initialization voltage to the voltage supply based on the sensing voltage control signal.

According to some embodiments, the pixels may be coupled to scan lines and control lines, each of the pixels including a light-emitting element; a first transistor including a gate electrode coupled to a first node, a first electrode coupled to a first driving voltage through a first power line, and a second electrode coupled to a first electrode of the light-emitting element; a second transistor including a gate electrode coupled to one of the scan lines, a first electrode coupled to one of the data lines, and a second electrode coupled to the first node; a third transistor including a gate electrode coupled to one of the control lines, a first electrode coupled to one of the sensing lines, and a second electrode coupled to the second electrode of the first transistor; and a storage capacitor coupled between the first node and the second electrode of the first transistor.

According to some embodiments, the driving transistor may be the first transistor, and a scan signal may be supplied to the scan line and a control signal may be supplied to the control line during the display period.

Aspects of some embodiments may include a display device driven to have a display period for displaying an image and a sensing period for sensing characteristics of a driving transistor. The display device may include pixels coupled to data lines and sensing lines; a data driver configured to supply one of an image data signal and a sensing data signal to the data lines; a voltage supply configured to supply an initialization voltage to the pixels through the sensing lines; and a sensing circuit configured to receive an analog sensing value from at least one of the pixels through the sensing lines, convert the analog sensing value to a digital sensing code, compare the digital sensing code with a maximum sensing code or a minimum sensing code to generate a sensing voltage control signal to control at least one of the sensing data signal or the initialization voltage based on a value of the comparing.

According to some embodiments, the sensing circuit may generate a first sensing voltage control signal when a value of the comparing between the digital sensing code and the maximum sensing code is less than a preset reference range, and generate a second sensing voltage control signal when the value of the comparing between the digital sensing code and the minimum sensing code is less than a preset reference range.

According to some embodiments, the display device may further include a timing controller configured to generate compensated image data by reflecting the digital sensing code in input image data, and provide the compensated image data to the data driver.

According to some embodiments, the sensing circuit may compare the digital sensing code with the maximum sensing code or the minimum sensing code, and when a value of the comparing is out of a preset reference range, provide the digital sensing code to the timing controller.

According to some embodiments, the timing controller may receive the sensing voltage control signal, supply a signal to change the sensing data signal to the data driver based on the sensing voltage control signal, and supply a signal to change the initialization voltage to the voltage supply based on the sensing voltage control signal.

Aspects of some embodiments may include a method of driving a display device including pixels coupled to data lines and sensing lines and driven to have a display period for displaying an image and a sensing period for sensing characteristics of a driving transistor included in each of the pixels. The method may include supplying a sensing data signal to the data line and an initialization voltage to the sensing lines in the sensing period; receiving an analog sensing value from at least one of the pixels through the sensing lines; and comparing the analog sensing value with a sensing reference voltage to generate a sensing voltage control signal to control at least one of the sensing data signal or the initialization voltage.

According to some embodiments, generating the sensing voltage control signal may include generating a first sensing voltage control signal when the analog sensing value is greater than the sensing reference voltage, and generating a second sensing voltage control signal when the analog sensing value is less than the sensing reference voltage.

According to some embodiments, the method may further include receiving the analog sensing value and converting the analog sensing value to a digital sensing code.

According to some embodiments, the method may further include receiving the digital sensing code, and comparing the digital sensing code with a maximum sensing code or a minimum sensing code to generate the sensing voltage control signal based on a value of the comparing.

DETAILED DESCRIPTION

Figure 1:
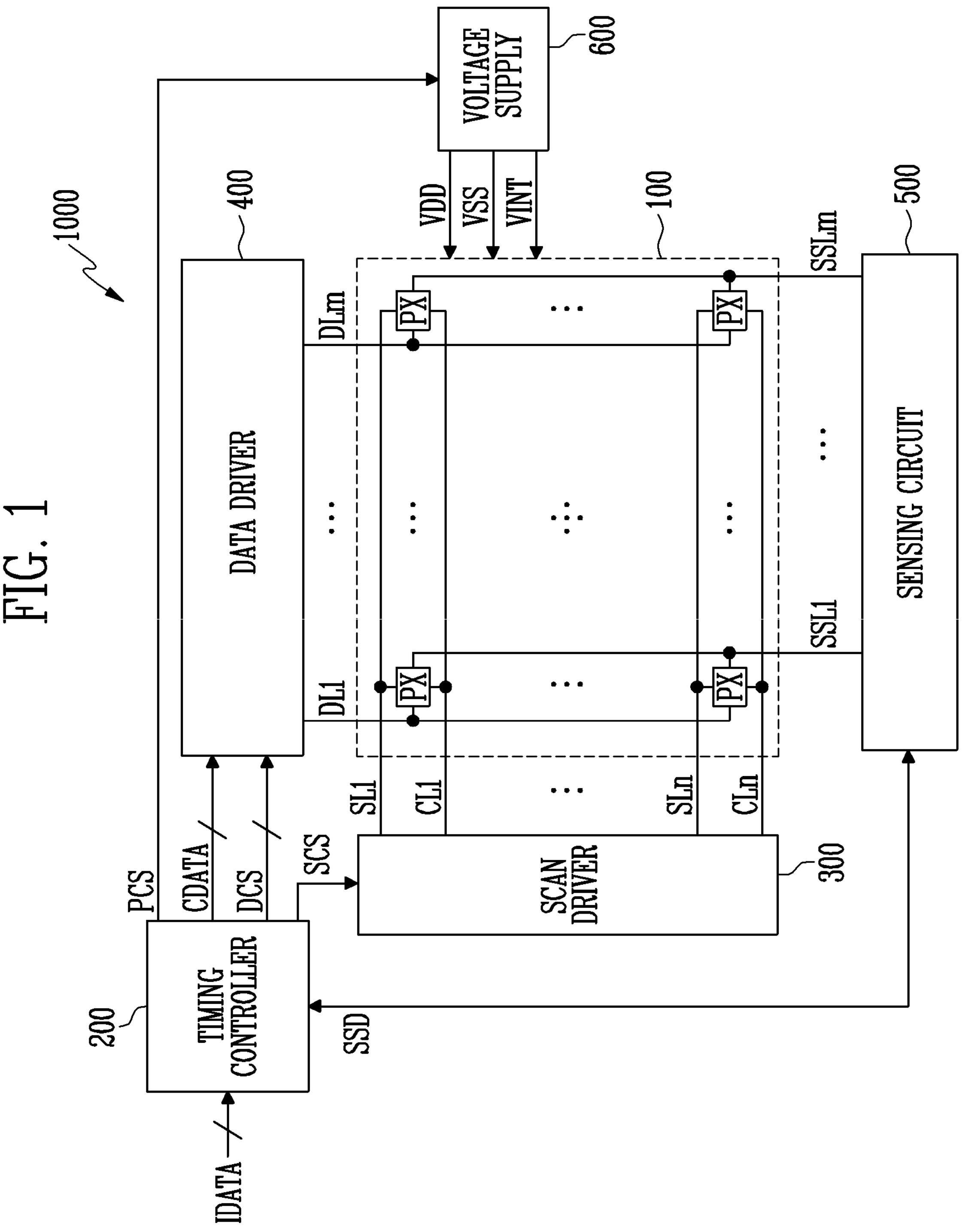
FIG. 1 is a block diagram of a display device according to some embodiments.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope are encompassed in the present disclosure.

It will be understood that, although the terms "first" and "second" may be used herein to describe various elements, these elements should not be limited by these terms. These terms are only used to distinguish one element from other elements. For instance, a first element discussed below could be termed a second element without departing from the teachings. Similarly, the second element could also be termed the first element. In the present disclosure, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

A display device according to embodiments will now be described with reference to accompanying drawings.

FIG. 1 is a block diagram of a display device according to some embodiments.

Referring to FIG. 1, a display device 1000 may include a pixel array 100, a timing controller 200, a scan driver 300, a data driver 400, a sensing circuit 500, and a voltage supply 600.

The display device 1000 may be a flat display device, a flexible display device, a curved display device, a foldable display device, a bendable display device, or the like. Furthermore, the display device 1000 may be applied to a transparent display device, a head-mounted display device, a wearable display device, etc. The display device 1000 may also be applied to other various electronic devices such as smart phones, tablets, smart pads, televisions, monitors, etc.

In the meantime, the display device 1000 may be implemented as an organic light emitting display device, inorganic light emitting display device, etc. These are merely examples, and the configuration of the display device 1000 is not limited thereto.

According to some embodiments, the display device 1000 may be driven to have a display period for displaying an image or images and a sensing period for sensing characteristics of a driving transistor included in each pixel PX. A method of driving the display device 1000 will be described in more detail later in connection with FIG. 3.

The pixel array 100 includes pixels PXs coupled to data lines DL1 to DLm, scan lines SL1 to SLn, control lines CL1 to CLn, and sensing lines SSL1 to SSLm, where m and n are integer numbers. The pixels PXs may receive a first driving voltage VDD, a second driving voltage VSS, and an initialization voltage VINT from a voltage supply 600, which will be described later.

Although n scan lines SL1 to SLn are shown in FIG. 1, embodiments according to the present disclosure are not limited thereto. For example, based on a circuit structure of the pixel PX, one or more control lines, scan lines, light emitting control lines, sensing lines, etc., may be additionally arranged in the pixel array 100.

The timing controller 200 may generate a data driving control signal DCS, a scan driving control signal SCS, and a power driving control signal PCS according to or based on synchronization signals supplied from the outside. The scan driving control signal SCS generated by the timing controller 200 may be supplied to the scan driver 300; the data driving control signal DCS may be supplied to the data driver 400; and the power driving control signal PCS may be supplied to the voltage supply 600.

The scan driving control signal SCS may include a scan start signal, a control start signal, and clock signals. The scan start signal may control the timing of a scan signal. The control start signal may control the timing of a control signal. The clock signals may be used to shift the scan start signal and/or the control start signal.

The data driving control signal DCS may include a source start signal and clock signals. The source start signal may control a time to start data sampling. The clock signals may be used to control sampling operation.

The power driving control signal PCS may control whether to supply the first driving voltage VDD, the second driving voltage VSS, and the initialization voltage VINT and levels of the voltages.

The timing controller 200 may control operation of the sensing circuit 500. For example, the timing controller 200 may control a time to supply the initialization voltage VINT to the pixels PXs through the sensing lines SSL1 to SSLm, and/or a time to detect a current produced from the pixel PX through the sensing lines SSL1 to SSLm.

Furthermore, according to some embodiments, the timing controller 200 may receive a sensing voltage control signal from the sensing circuit 500, and provide a signal to change the sensing data signal and/or the initialization voltage VINT to the data driver 400 and/or the voltage supply 600 based on the sensing voltage control signal.

The timing controller 200 may generate a compensation value for compensating characteristic values of the pixels PXs based on the digital sensing code SSD provided from the sensing circuit 500. For example, the timing controller 200 may compensate input image data IDATA by reflecting a change in threshold voltage of the driving transistor included in the pixel PX, a change in mobility, and a change in characteristics of the light-emitting element.

The timing controller 200 may supply the data driver 400 with compensated image data CDATA generated by reflecting the digital sensing code SSD in the input image data IDATA. The input image data IDATA and the compensated image data CDATA may include gray scale information in a gray scale range set for the display device 1000.

The scan driver 300 may receive the scan driving control signal SCS from the timing controller 200. Upon receiving the scan driving control signal SCS, the scan driver 300 may supply a scan signal to the scan lines SL1 to SLn and supply a control signal to the control lines CL1 to CLn.

For example, the scan driver 300 may supply the scan signal to the scan lines SL1 to SLn in sequence. When the scan signal is supplied to the scan lines SL1 to SLn in sequence, the pixels PXs may be selected in horizontal lines. For this, the scan signal may be set to a gate-on voltage (e.g., a level of logical high) to turn on transistors included in the pixels PXs.

Likewise, the scan driver 300 may supply a control signal to the control lines CL1 to CLn. The control signal may be used to sense (or detect) a driving current flowing in the pixel PX (i.e., a current flowing through the driving transistor). Times and waveforms in which the scan signal and the control signal are supplied may be differently set depending on the display period and the sensing period.

Although the one scan driver 300 is shown in FIG. 1 as outputting both the scan signal and the control signal, embodiments are not limited thereto. For example, the scan driver 300 may include a first scan driver for supplying the scan signal to the pixel array 100 and a second scan driver for supplying the control signal to the pixel array 100.

The data driver 400 may receive the data driving control signal DCS from the timing controller 200. The data driver 400 may supply a data signal (e.g., a sensing data signal) for detecting pixel characteristics during the sensing period to the pixel array 100. The data driver 400 may supply the pixel array 100 with a data signal (e.g., an image data signal) to display an image or images during the display period based on the compensated image data CDATA.

During the display period, the sensing circuit 500 may supply a certain reference voltage to display the image or images to the pixel array 100 through the sensing lines SSL1 to SSLm.

During the sensing period, the sensing circuit 500 may receive a sensing value provided from at least one of the pixels PXs through the sensing lines SSL1 to SSLm, and compare the sensing value with a sensing reference value to generate a sensing voltage control signal to change the sensing voltage range. For example, the sensing circuit 500 may generate a sensing voltage control signal to control at least one of the sensing data signal or the initialization voltage VINT.

For example, during the sensing period, the sensing circuit 500 may allow a certain reference voltage (e.g., the initialization voltage VINT) to be supplied to the pixels PXs through the sensing lines SSL1 to SSLm, and receive a current or a voltage detected from the pixel PX. The current and the voltage detected from the pixel PX may correspond to a sensing value, which may include characteristic information of the driving transistor, information of the light-emitting element, or the like.

However, when the sensing data signal (or sensing data voltage) applied to the gate electrode of the driving transistor is less than a threshold voltage of the driving transistor due to a change in characteristics of the driving transistor or the light-emitting element, the sensing circuit 500 may not detect a sensing value from the sensing lines SSL1 to SSLm.

In this case, the timing controller 200 may not properly compensate the input image data IDATA based on the change in characteristics of the pixel PX, and may not provide a properly compensated image data CDATA to the data driver 400.

Hence, the sensing circuit 500 according to some embodiments may detect a sensing value (e.g., a sensing voltage or sensing current) and compare the sensing value with a sensing reference value to control at least one of the sensing data signal or the initialization voltage, thereby securing a sensing voltage range within which to detect the sensing value even when characteristics of the driving transistor or characteristics of the light-emitting element are changed. The sensing value may correspond to an analog sensing value or a digital sensing code, and the sensing reference value may correspond to one of a sensing reference voltage, a maximum sensing code, or a minimum sensing code.

Although the sensing circuit 500 is shown in FIG. 1 as a separate component from the timing controller 200, at least some configurations in the sensing circuit 500 may be integrated in the timing controller 200. For example, the sensing circuit 500 and the timing controller 200 may be formed in a single driving integrated circuit (IC). Furthermore, the data driver 400 may also be integrated in the timing controller 200. Accordingly, at least some of the sensing circuit 500, the data driver 400, or the timing controller 200 may be formed in a single driving IC.

The voltage supply 600 may apply the first driving voltage VDD, the second driving voltage VSS, and the initialization voltage VINT to the pixel array 100 based on the power driving control signal PCS. According to some embodiments, the first driving voltage VDD may determine a voltage for the first electrode of the driving transistor (e.g., a drain voltage), and the second driving voltage VSS may determine a cathode voltage of the light-emitting element. The initialization voltage VINT may provide a certain reference voltage to detect characteristics of the driving transistor in the sensing period.

A pixel included in the display device according to some embodiments will now be described in more detail in connection with FIG. 2.

Figure 2:
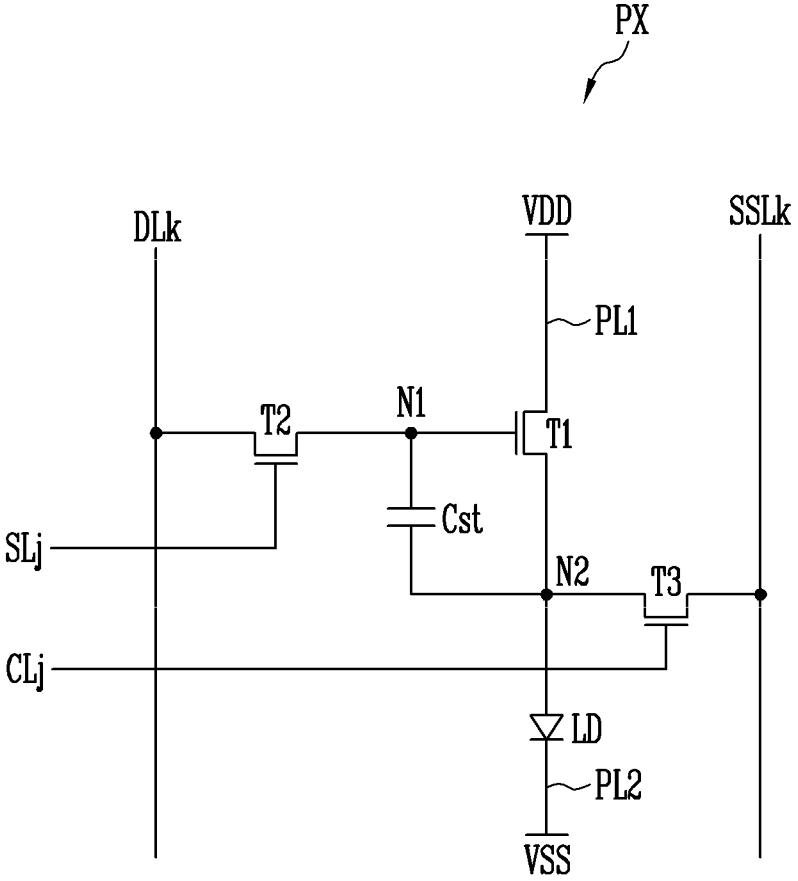
FIG. 2 is a circuit diagram illustrating an example of a pixel included in the display device of FIG. 1.

FIG. 2 is a circuit diagram illustrating an example of a pixel included in the display device of FIG. 1. In FIG. 2, for convenience of explanation, a circuit diagram of the pixel PX located in j-th row (horizontal line) and k-th column is illustrated.

Referring to FIG. 2, the pixel PX may include a light-emitting element LD, a first transistor T1 (driving transistor), a second transistor T2, a third transistor T3, and a storage capacitor Cst.

A first electrode (anode or cathode) of the light-emitting element LD is coupled to a second node N2, and a second electrode (cathode or anode) is coupled to the second driving voltage VSS through a second power line PL2. The light-emitting element LD produces light of a certain brightness corresponding to an amount of current applied from the first transistor T1.

A first electrode of the first transistor T1 is coupled to the first driving voltage VDD through a first power line PL1, and a second electrode is coupled to the first electrode of the light-emitting element LD. A gate electrode of the first transistor T1 may be coupled to a first node N1. The first transistor T1 may control an amount of current flowing to the light-emitting element LD based on a voltage at the first node N1

A first electrode of the second transistor T2 may be coupled to a data line DLk, and a second electrode may be coupled to the first node N1. A gate electrode of the second transistor T2 may be coupled to a scan line SLj. The second transistor T2 may be turned on when a scan signal is provided to the scan line SLj, and may then send a data signal from the data line DLk to the first node N1.

The third transistor T3 may be coupled between the sensing line SSLk and the second electrode of the first transistor T1 (i.e., the second node N2). For example, a first electrode of the third transistor T3 may be coupled to the sensing line SSLk; a second electrode may be coupled to the second electrode of the first transistor T1; a gate electrode of the third transistor T3 may be coupled to a control line CLj. The third transistor T3 may be turned on when a control signal is provided to the control line CLj to make the second node N2, i.e., the second electrode of the first transistor T1, electrically connected to the sensing line SSLk.

For example, when the third transistor T3 is turned on, the initialization voltage VINT may be applied to the second node N2. In an example, when the third transistor T3 is turned on, the current produced from the first transistor T1 may be applied to the sensing circuit 500 (see FIG. 1).

The storage capacitor Cst may be coupled between the first node N1 and the second node N2. The storage capacitor Cst may store a voltage corresponding to a voltage difference between the first node N1 and the second node N2.

According to some embodiments, the circuit structure of the pixel PX is not limited what is shown in FIG. 2. For example, the light-emitting element LD may be located between the first power line PL1 and the first electrode of the first transistor T1. Furthermore, a parasitic capacitor may be formed between the gate electrode, i.e., the first node N1, and the drain electrode of the first transistor T1.

Although the transistors T1, T2, and T3 shown in FIG. 2 are n-channel metal oxide semiconductors (NMOSs), embodiments according to the present disclosure are not limited thereto. For example, at least one of the transistors T1, T2, or T3 may correspond to a p-channel metal oxide semiconductors (PMOSs). Alternatively, the transistors T1, T2, and T3 shown in FIG. 2 may be thin film transistors including at least one of an oxide semiconductor, an amorphous silicon semiconductor, or a polycrystalline silicon semiconductor.

A method of driving the display device 1000 of FIG. 1 and the pixel PX of FIG. 2 will now be described in connection with FIG. 3.

Figure 3:
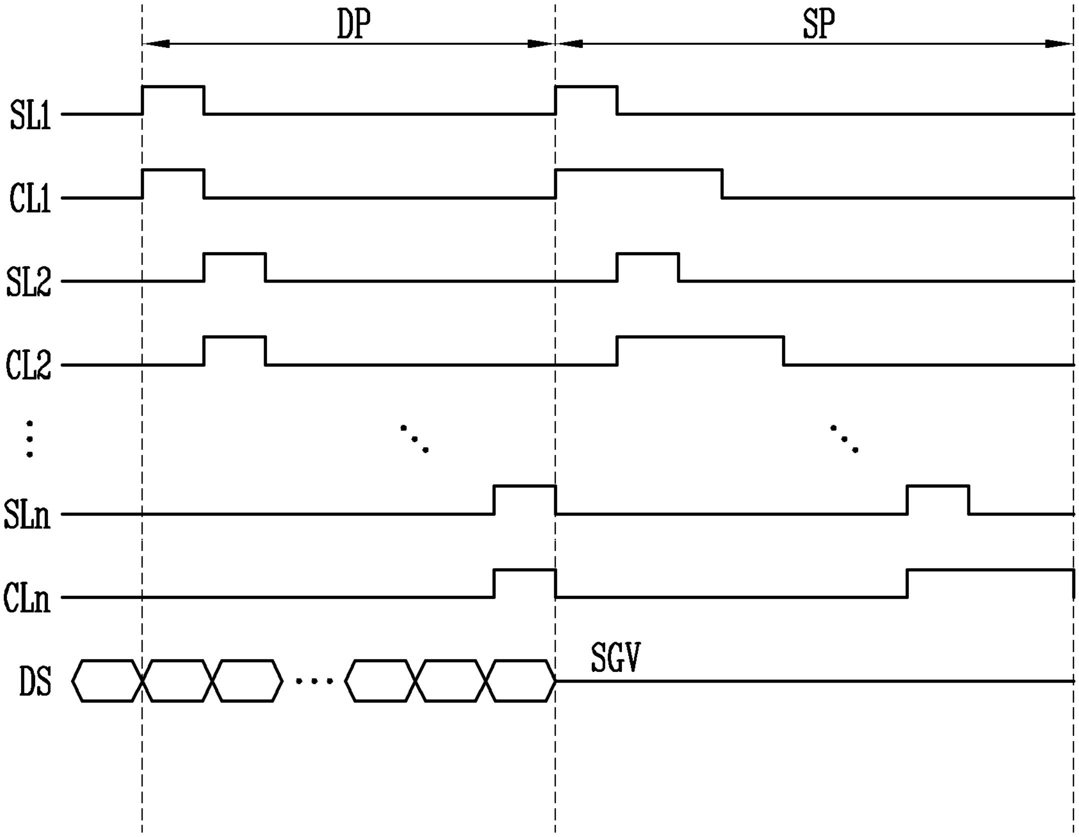
FIG. 3 is a timing diagram illustrating an example of operation of the display device of FIG. 1.

FIG. 3 is a timing diagram illustrating an example of operation of the display device 1000 of FIG. 1.

Referring to FIGS. 1 to 3, the display device 1000 may be driven to have a display period DP for displaying an image and a sensing period SP for detecting characteristics of a driving transistor (or the first transistor T1) included in each pixel PX.

According to some embodiments, during the sensing period SP, the input image data IDATA may be compensated or adjusted based on the characteristic information detected from the pixel PX, e.g., the digital sensing code SSD.

During the display period DP, the scan driver 300 may supply a scan signal to the scan lines SL1 to SLn in sequence. During the display period DP, the scan driver 300 may supply a control signal to the control lines CL1 to CLn in sequence. Furthermore, during the display period DP, the initialization voltage VINT, which is a constant voltage, may be applied to the sensing lines SSL1 to SSLm.

For a j-th horizontal line, the scan signal and the control signal may be applied at substantially the same time. Accordingly, the second transistor T2 and the third transistor T3 may be simultaneously or concurrently turned on or off.

When the second transistor T2 is turned on, an image data signal DS corresponding to the compensated image data CDATA may be supplied to the first node N1.

When the third transistor T3 is turned on, the initialization voltage VINT may be applied to the second node N2. Accordingly, the storage capacitor Cst may store a voltage corresponding to a voltage difference between the image data signal DS and the initialization voltage VINT. The initialization voltage VINT is set to a constant voltage, so that the voltage stored in the storage capacitor Cst may be stably determined according to the image data signal DS.

When application of the scan signal and the control signal to the j-th scan line SLj and the j-th control line CLj is stopped, the second transistor T2 and the third transistor T3 may be turned off.

After this, the first transistor T1 may control an amount of current (or a driving current) applied to the light-emitting element LD based on the voltage stored in the storage capacitor Cst. Accordingly, the light-emitting element LD may emit light with a brightness corresponding to the driving current of the first transistor T1.

During the sensing period SP, the scan driver 300 may supply the scan signal to the scan lines SL1 to SLn in sequence. During the sensing period SP, the scan driver 300 may supply the control signal to the control lines CL1 to CLn in sequence.

A length of the control signal supplied in the sensing period SP may be longer than the length of the control signal supplied in the display period DP. Furthermore, in the sensing period SP, a portion of the control signal supplied to the j-th control line CLj may overlap the scan signal supplied to the j-th scan line SLj. The length of the control signal may be longer than the length of the scan signal. For example, the control signal may start to be supplied to the j-th control line CLj simultaneously or concurrently with the scan signal supplied to the j-th scan line SLj, in which case the control signal may last longer than the scan signal.

When the scan signal and the control signal are supplied simultaneously or concurrently, the second and third transistors T2 and T3 are turned on. When the second transistor T2 is turned on, a sensing data signal or sensing data voltage SGV for detection may be supplied to the first node N1. At the same time, the initialization voltage VINT may be applied to the second node N2 as the third transistor T3 is turned on. Accordingly, the storage capacitor Cst may store a voltage corresponding to a voltage difference between the sensing data signal SVG and the initialization voltage VINT.

After this, when application of the scan signal is stopped, the second transistor T2 may be turned off. When the second transistor T2 is turned off, the first node N floats. The first transistor T1 may then apply a sensing current corresponding to the sensing data signal SGV to the second node N2, so the voltage at the second node N2 may increase.

A detection method of the display device 1000 according to some embodiments will now be described in more detail in connection with FIGS. 4 to 6.

Figure 4:
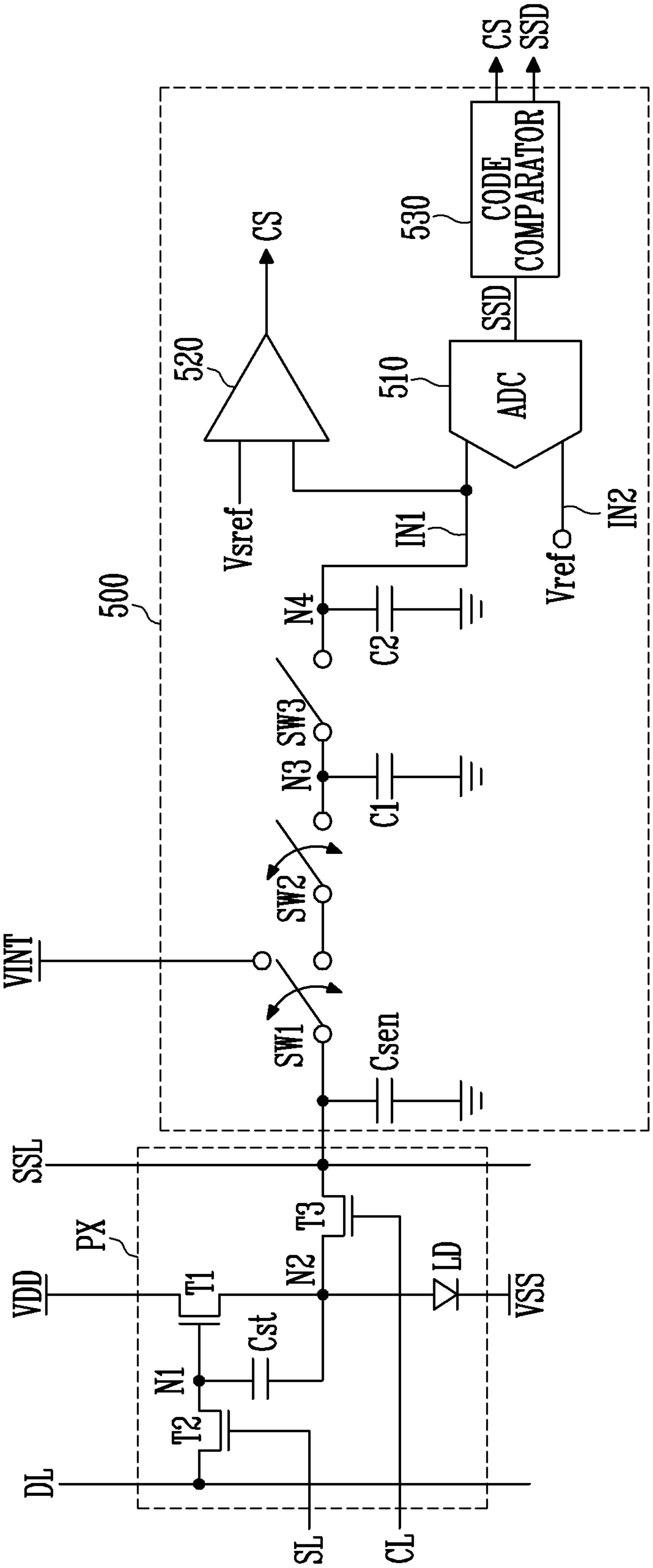
FIG. 4 illustrates a pixel and a sensing circuit according to some embodiments.
Figure 5:
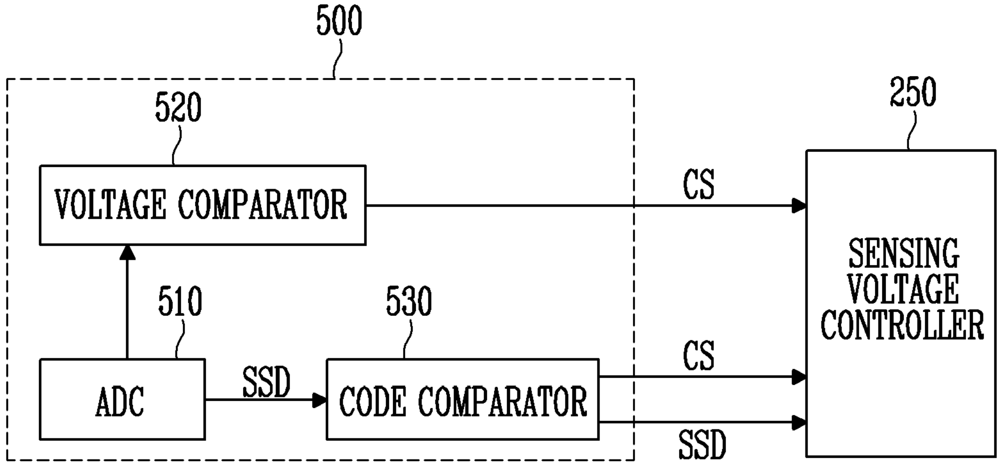
FIG. 5 illustrates a sensing circuit and a sensing voltage controller according to some embodiments.
Figure 6:
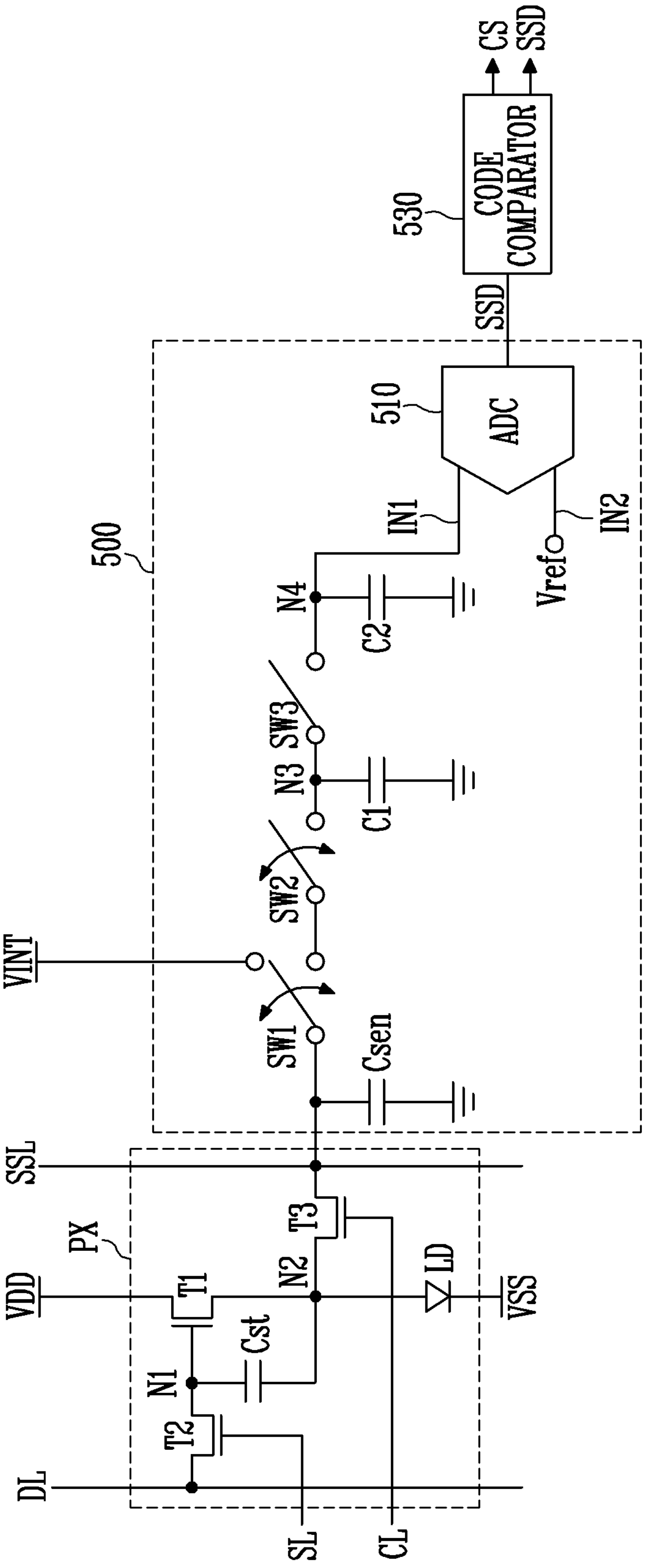
FIG. 6 illustrates a pixel and a sensing circuit according to some embodiments.

FIG. 4 illustrates a pixel and a sensing circuit according to some embodiments, FIG. 5 illustrates a sensing circuit and a sensing voltage controller according to some embodiments, and FIG. 6 illustrates a pixel and a sensing circuit according to some embodiments.

Referring to FIGS. 4 to 6, according to some embodiments, the pixel PX may be coupled to the sensing line SSL, and the sensing line SSL may be coupled to the sensing circuit 500.

The sensing circuit 500 may include a sensing capacitor Csen, a first switch SW1, a second switch SW2, a third switch SW3, a first capacitor C1, and a second capacitor C2.

The first switch SW1 may be coupled between a power line, to which the initialization voltage VINT is applied, and the sensing line SSL. Turning back to FIGS. 2 and 3, the first switch SW1 may couple the power line, to which the initialization voltage VINT is applied, to the sensing line SSL during the display period DP, and during the sensing period SP, couple the power line, to which the initialization voltage VINT is applied, to the sensing line SSL when the scan signal and the control signal are simultaneously or concurrently supplied so that the second and third transistors T2 and T3 are turned on. In this case, it may be said that the first switch SW1 is turned on. During the rest of the period, the first switch SW1 may couple the sensing line SSL to the second switch SW2.

The sensing capacitor Csen may be coupled to the sensing line SSL. In a case that the first switch SW1 is not coupled to the power line, to which the initialization voltage VINT is applied, i.e., the first switch SW1 is turned off, when the third transistor T3 of the pixel PX is in a turned-on state, the sensing capacitor Csen may be charged with a voltage detected at the second node N2. In other words, the sensing capacitor Csen may store characteristic information of the pixel PX provided through the second node N2. Accordingly, a sensing current flowing in the sensing line SSL may be calculated based on the voltage (or electric charge) charged in the sensing capacitor Csen. In this case, the voltage or the sensing current charged in the sensing capacitor Csen may be referred to as a sensing value (or an analog sensing value). According to some embodiments, there may be a resistor positioned between the sensing line SSL and the sensing capacitor Csen.

The second switch SW2 may be coupled between the sensing line SSL and the third node N3, and the first capacitor C1 may be coupled between the third node N3 and a reference voltage (e.g., a ground voltage or power). While the second switch SW2 is turned on, the first capacitor C1 may sample the characteristic information of the first transistor T1 stored in the sensing capacitor Csen.

The third switch SW3 may be coupled between the third node N3 and a fourth node N4, and the second capacitor C2 may be coupled between the fourth node N4 and the reference voltage (e.g., ground power). When the third switch SW3 is turned on, the first capacitor C1 and the second capacitor C2 may share charge, and voltages at the third node N3 and the fourth node N4 may be changed.

Furthermore, the sensing circuit 500 may include an analog-to-digital converter (ADC) 510, a voltage comparator 520, and a code comparator 530. According to some embodiments, the sensing circuit 500 may only include the ADC 510 and the code comparator 530.

The sensing circuit 500 shown in FIGS. 4 and 5 may compare an analog sensing value with a sensing reference voltage to generate a sensing voltage control signal to change a sensing voltage range. The sensing circuit 500 shown in FIG. 6 may compare a digital sensing code with a maximum sensing code or a minimum sensing code to generate the sensing voltage control signal to change the sensing voltage range. Alternatively, the sensing circuit 500 shown in FIGS. 4 and 5 may compare both the analog sensing value and the digital sensing code to generate the sensing voltage control signal to change the sensing voltage range.

The ADC 510 may convert an analog sensing value provided to a first input terminal IN1 through the fourth node N4 to a data value (e.g., a digital sensing code SSD). In this case, the ADC 510 may convert the analog sensing value at the first input terminal IN1 to the digital sensing code SSD by reflecting a difference in voltage from the reference voltage Vref provided to a second input terminal IN2. The first input terminal IN1 may be referred to as an input terminal, and the reference voltage Vref may be the same as the initialization voltage VINT provided to the sensing line SSL.

A sensing signal in a digital form (e.g., the digital sensing code SSD) may be provided to the timing controller 200 through the code comparator 530, which will be described in more detail later, and the timing controller 200 may generate a compensation value to compensate the characteristic value of the pixel PX based on the digital sensing code SSD provided to the sensing circuit 500.

The voltage comparator 520 may be coupled to the first input terminal of the ADC 510 (or the fourth node N4). The voltage comparator 520 may compare the analog sensing value with a sensing reference voltage Vsref to generate a sensing voltage control signal CS. According to some embodiments, the voltage comparator 520 may be implemented as an operational amplifier (OP-AMP), without being limited thereto.

The voltage comparator 520 may provide the sensing voltage control signal CS to a sensing voltage controller 250. The sensing voltage control signal CS may include a first sensing voltage control signal and a second sensing voltage control signal. The first sensing voltage control signal may be a signal to change at least one of the sensing data signal or the initialization voltage VINT to be lower than the previous sensing data signal and the previous initialization voltage VINT, and the second sensing voltage control signal may be a signal to change at least one of the sensing data signal or the initialization voltage VINT to be higher than the previous sensing data signal and the previous initialization voltage VINT.

According to some embodiments, the voltage comparator 520 may generate the first sensing voltage control signal when the analog sensing value is greater than the sensing reference voltage Vsref, and generate the second sensing voltage control signal when the analog sensing value is less than the sensing reference voltage Vsref.

The code comparator 530 may receive the digital sensing code SSD from the ADC 510, and supply the digital sensing code SSD to the timing controller 200.

Furthermore, the code comparator 530 may compare the received digital sensing code SSD with the maximum sensing code or the minimum sensing code to generate the sensing voltage control signal CS based on a value of the comparing.

For example, the code comparator 530 may generate the first sensing voltage control signal when the value of the comparing between the digital sensing code SSD and the maximum sensing code is less than a preset reference range, and generate a second sensing voltage control signal when the value of the comparing between the digital sensing code SSD and the minimum sensing code is less than a preset reference range. In other words, the code comparator 530 may generate the first sensing voltage control signal to change at least one of the sensing data signal or the initialization voltage VINT to be lower than the previous sensing data signal and the previous initialization voltage VINT, when the digital sensing code SSD approaches the maximum sensing code as close as in a preset range. The code comparator 530 may generate the second sensing voltage control signal to change at least one of the sensing data signal or the initialization voltage VINT to be higher than the previous sensing data signal and the previous initialization voltage VINT, when the digital sensing code SSD approaches the minimum sensing code as close as in a preset range.

Furthermore, the code comparator 530 may compare the digital sensing code SSD with the maximum sensing code or the minimum sensing code, and when a value of the comparing is out of a preset reference range, provide the digital sensing code SSD to the timing controller 200. For example, when the digital sensing code SSD does not approach the maximum sensing code or the minimum sensing code as close as in the preset range, the code comparator 530 may determine that the value of the comparing is in a suitable sensing voltage range and thus not generate the sensing voltage control signal CS.

The sensing voltage controller 250 may be included in the timing controller 200. The sensing voltage controller 250 may receive the sensing voltage control signal CS from the voltage comparator 520 and/or the code comparator 530. For example, the sensing voltage controller 250 may receive the sensing voltage control signal CS from the voltage comparator 520, when the sensing circuit 500 includes the voltage comparator 520 to compare the analog sensing value with the sensing reference voltage and generate a sensing voltage control signal to change the sensing voltage range. The sensing voltage controller 250 may receive the sensing voltage control signal CS from the code comparator 530, when the sensing circuit 500 includes the code comparator 530 to compare the digital sensing code with the maximum sensing code or the minimum sensing code and generate the sensing voltage control signal CS to change the sensing voltage range.

The sensing voltage controller 250 may provide a signal to change the sensing data signal to the data driver 400 based on the sensing voltage control signal CS. For example, when receiving the first sensing voltage control signal, the sensing voltage controller 250 may provide the data driver 400 with a signal to change the sensing data signal to be lower than the previous sensing data signal. Furthermore, when receiving the second sensing voltage control signal, the sensing voltage controller 250 may provide the data driver 400 with a signal to change the sensing data signal to be higher than the previous sensing data signal.

Moreover, the sensing voltage controller 250 may provide the voltage supply 600 with a signal to change the initialization voltage VINT based on the sensing voltage control signal CS. For example, when receiving the first sensing voltage control signal, the sensing voltage controller 250 may provide the voltage supply 600 with a signal to change the initialization voltage VINT to be lower than the previous initialization voltage VINT. Furthermore, when receiving the second sensing voltage control signal, the sensing voltage controller 250 may provide the voltage supply 600 with a signal to change the initialization voltage VINT to be higher than the previous initialization voltage VINT.

For example, when the sensing voltage controller 250 provides a signal to change the sensing data signal and the initialization voltage VINT to be lower than the previous sensing data signal and the previous initialization voltage to the data driver 400 and the voltage supply 600, respectively, based on the first sensing voltage control signal, the sensing data signal lower than the previous sensing data signal may be provided to the first node N1 of the pixel PX (see FIG. 2) and the initialization voltage VINT lower than the previous initialization voltage may be provided to the second node N2 of the pixel PX (see FIG. 2). As a value between the changed sensing data signal (or sensing data voltage) and the changed initialization voltage VINT falls within the sensing voltage range within which to detect a sensing value of the driving transistor, a driving current that the driving transistor controls according to a value at the first node N1 (see FIG. 2) of the pixel PX may be applied to the sensing circuit 500 through the second node N2 (see FIG. 2). With the sensing data and initialization voltage VINT changed by reflecting the sensing voltage control signal, the sensing voltage range within which to detect the sensing value of the driving transistor may be secured.

Accordingly, in an embodiments, the display device may detect the sensing value and control at least one of the sensing data signal or the initialization voltage, thereby securing a sensing voltage range within which to detect a sensing value even when characteristics of the driving transistor or characteristics of the light-emitting element is changed.

Effects and characteristics of the display device according to a comparative example and further aspects of some embodiments will now be described in more detail in connection with FIGS. 7 and 8.

Figure 7:
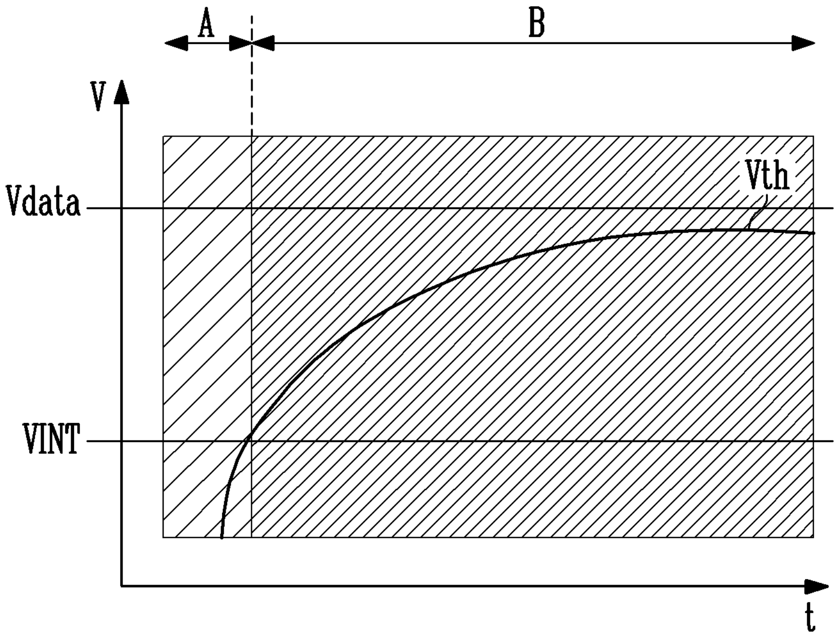
FIG. 7 illustrates a graph representing a sensing voltage range of a display device according to some embodiments.
Figure 8:
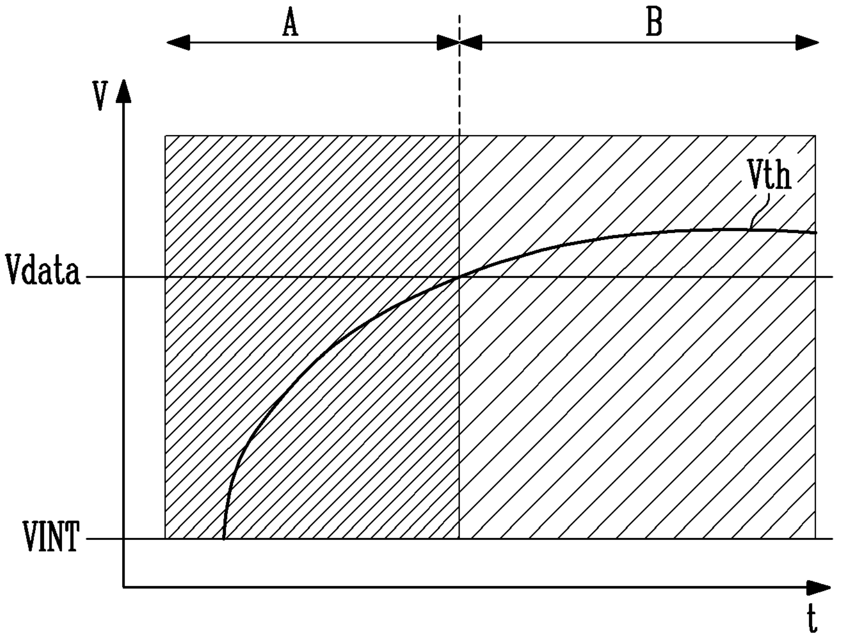
FIG. 8 illustrates a graph representing a sensing voltage range of a display device according to some embodiments.

FIG. 7 illustrates a graph representing a sensing voltage range of a display device according to some embodiments, and FIG. 8 illustrates a graph representing a sensing voltage range of a display device according to a comparative example.

Referring to FIG. 7, threshold voltage Vth of the driving transistor increases in time and is then saturated from a certain point in time. In this case, the threshold voltage Vth of the driving transistor may be saturated at a lower level than the data voltage Vdata. As described above with reference to FIGS. 1 and 3, the data voltage Vdata is based on the sensing data signal SGV provided to the data line DL from the data driver 400.

According to some embodiments, when the threshold voltage Vth of the driving transistor provided during the sensing period SP is greater than the initialization voltage VINT but less than the data voltage Vdata, a characteristic change of the driving transistor may be detected. That is, the display device 1000 may detect a change in characteristics of the driving transistor in area B. On the other hand, in area A, the threshold voltage Vth of the driving transistor is lower than the initialization voltage VINT and no driving current may flow to the driving transistor, so the display device 1000 is not able to detect a characteristic change of the driving transistor.

According to some embodiments, the display device 1000 may detect a sensing value during the sensing period SP, and control at least one of the sensing data signal or the initialization voltage VINT even when there is a change in characteristics of the driving transistor or characteristics of the light-emitting element. For example, according to some embodiments, the display device 1000 may secure area B whose time lasts longer than the area A, i.e., the display device 1000 may secure a wider sensing voltage range within which to detect a sensing value, thereby smoothly detecting a change in characteristics of the driving transistor during the sensing period SP.

Referring to FIG. 8, time of the area A of the display device according to a comparative example increases compared to the time of area A of the display device according to some embodiments as described above in connection with FIG. 7, and time of area B of the display device according to the comparative example decreases compared to the time of area B of the display device according to some embodiments as described above in connection with FIG. 7

In other words, during the sensing period SP, the display device according to the comparative example may have the area B of a reduced time and the area A of an increased time, so that a time for which to detect a change in characteristics of the driving transistor may be reduced.

Accordingly, referring to FIGS. 7 and 8, a display device according to some embodiments may detect a sensing value during the sensing period SP and control at least one of the sensing data signal or the initialization voltage, thereby ensuring to secure a sensing voltage range within which to detect a sensing value even when characteristics of a driving transistor or characteristics of a light-emitting element is changed.

A method of driving a display device according to some embodiments will now be described in more detail in connection with FIGS. 9 and 10.

Figure 9:
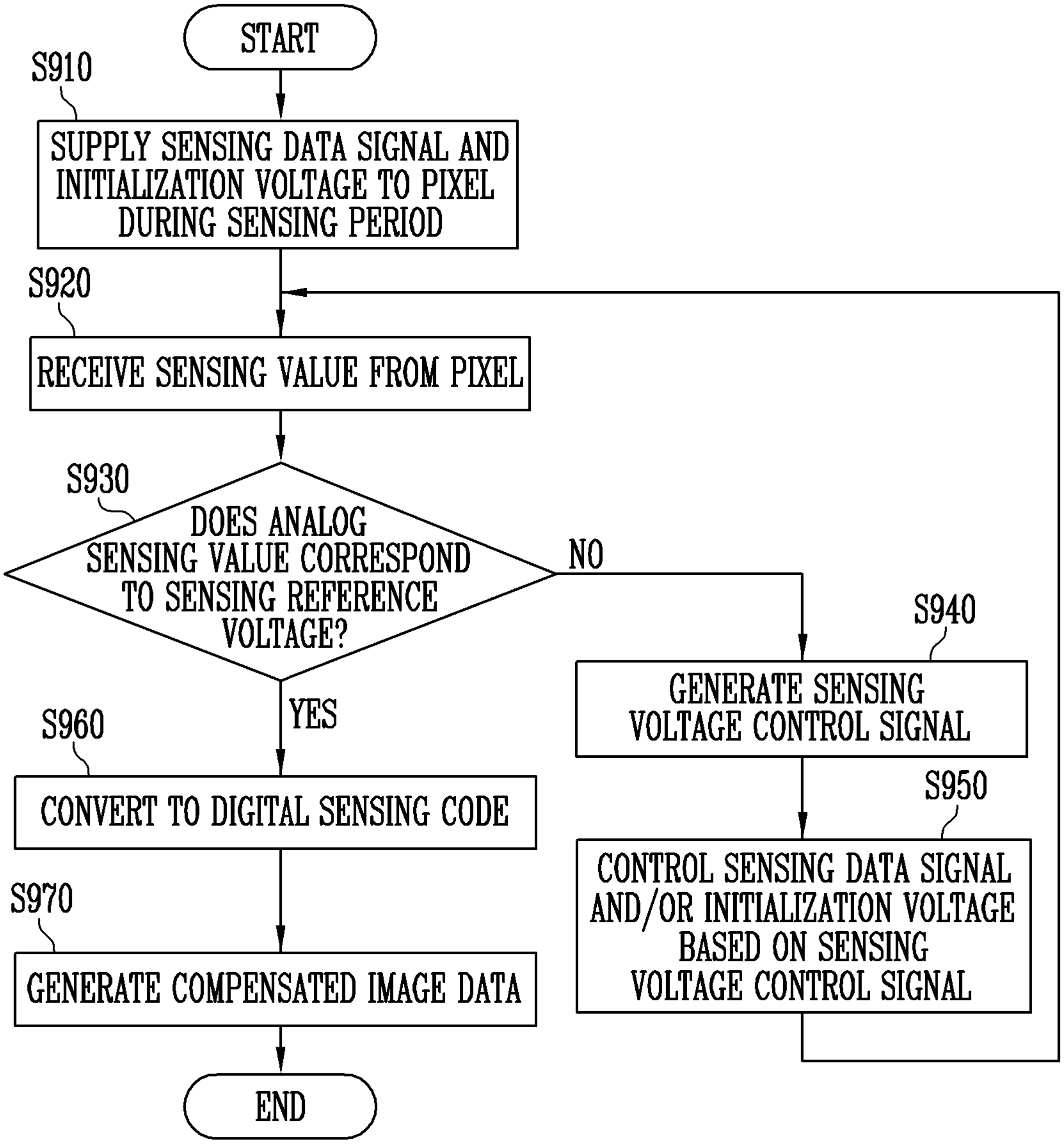
FIGS. 9 and 10 are flowcharts illustrating a method of driving a display device according to some embodiments.
Figure 10:
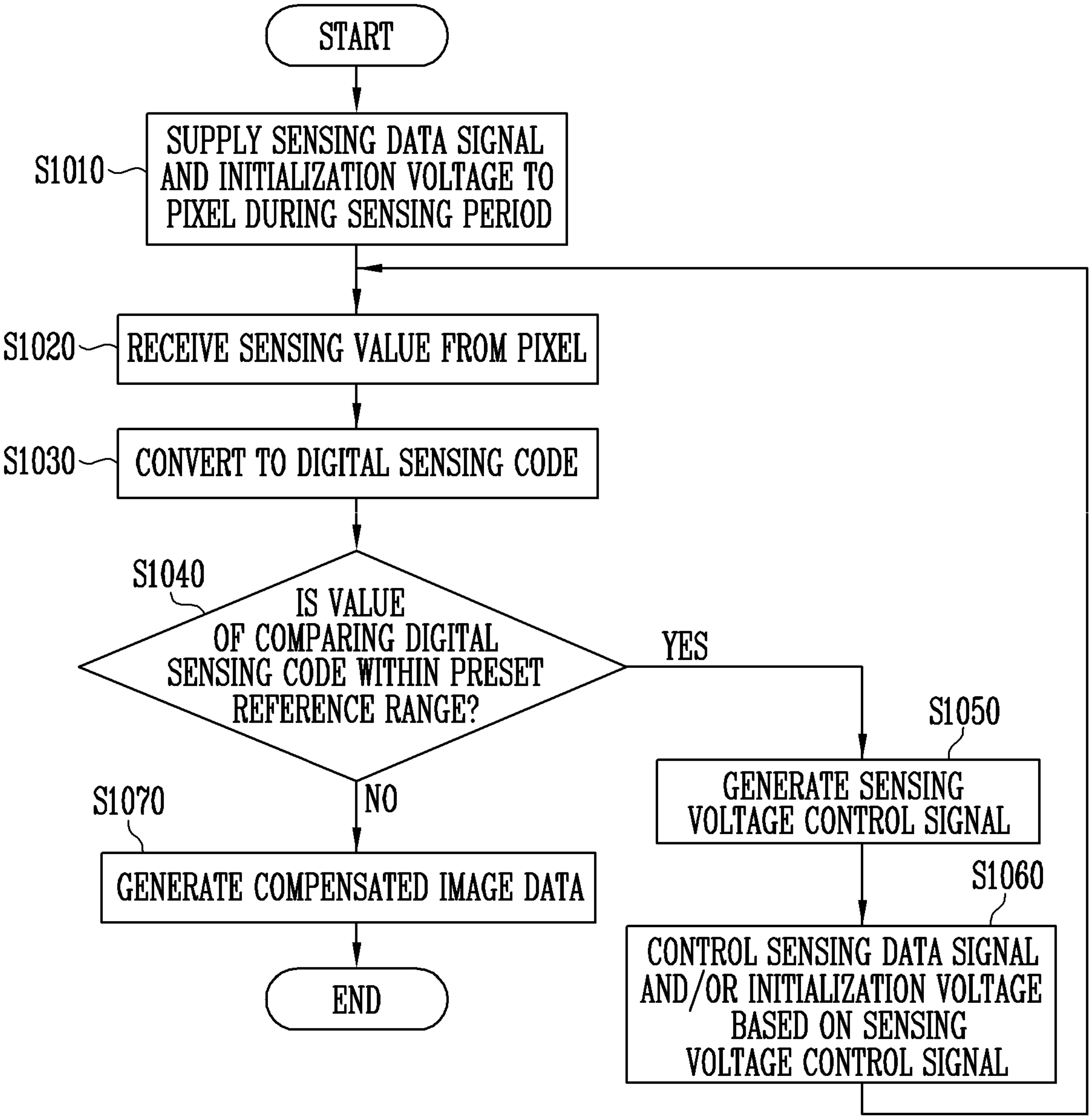

FIGS. 9 and 10 are flowcharts illustrating a method of driving a display device according to embodiments.

Referring to FIG. 9, a method of driving a display device according to some embodiments may include supplying a sensing data signal and an initialization voltage to a pixel during a sensing period at step S910, receiving a sensing value (or an analog sensing value) from the pixel at step S920 comparing the analog sensing value with a sensing reference voltage at S930, generating a sensing voltage control signal corresponding to an analog sensing comparison value at step S940, controlling the sensing data signal and/or the initialization voltage based on the sensing voltage control signal at step S950, converting the analog sensing value to a digital sensing code at step S960, and generating compensated image data by reflecting the digital sensing code in input image data at step S970.

In this case, when the analog sensing value is compared with the sensing reference voltage to generate the sensing voltage control signal and the analog sensing value does not correspond to the sensing reference voltage (in the case of NO), the display device may generate a sensing voltage control signal corresponding to an analog sensing comparison value, at step S940. For example, when the analog sensing value is greater than the sensing reference voltage, a first sensing voltage control signal may be generated, and when the analog sensing value is less than the sensing reference voltage, a second sensing voltage control signal may be generated.

According to some embodiments, when the analog sensing value corresponds to the sensing reference voltage (in the case of YES), the display device may convert the analog sensing value to a digital sensing code without generating a sensing voltage control signal at step S960.

Furthermore, according to some embodiments, the display device may control the sensing data signal and/or the initialization voltage based on the sensing voltage control signal, and supply the changed sensing data signal and/or the changed initialization voltage to the pixel during the sensing period SP, at step S910. Subsequently, the display device may receive a sensing value from the pixel at step S920, compare the analog sensing value with a sensing reference voltage at step S930, when the comparison reveals that the analog sensing value corresponds to the sensing reference voltage (in the case of YES), convert the analog sensing value to a digital sensing code at step S960 without generating a sensing voltage control signal, and generate compensated image data by reflecting the digital sensing code in input image data, at step S970.

Thus, according to some embodiments, the display device may detect the sensing value and control at least one of the sensing data signal or the initialization voltage, thereby securing a sensing voltage range within which to detect a sensing value even when characteristics of the driving transistor or characteristics of the light-emitting element is changed.

Referring to FIG. 10, a method of driving a display device according to some embodiments may include supplying a sensing data signal and an initialization voltage to a pixel during a sensing period at step S1010, receiving a sensing value (or an analog sensing value) from the pixel at step S1020, converting the analog sensing value to a digital sensing code at step S1030, and comparing the digital sensing code with a maximum sensing code or a minimum sensing code to determine whether the digital sensing code is within a preset range with the maximum sensing code or the minimum sensing code at step S1040, generating a sensing voltage control signal at step S1050, controlling the sensing data signal and/or the initialization voltage based on the sensing voltage control signal at step S1060, and generating compensated image data by reflecting the digital sensing code in input image data at step S1070.

In this case, when the digital sensing code is within the preset range with the maximum sensing code or the minimum sensing code (in the case of YES), the display device may generate a sensing voltage control signal corresponding to a value of the comparing between the digital sensing code and the maximum sensing code or the minimum sensing code at step S1040. For example, when the value of the comparing between the digital sensing code and the maximum sensing code is less than a preset reference range, a first sensing voltage control signal may be generated, and when the value of the comparing between the digital sensing code and the minimum sensing code is less than a preset reference range, a second sensing voltage control signal may be generated.

According to some embodiments, when the digital sensing code is not within the preset range with the maximum sensing code or the minimum sensing code (in the case of NO), the display device may generate compensated image data by reflecting the digital sensing code in input image data at step S1070 without generating a sensing voltage control signal.

Furthermore, according to some embodiments, the display device may control the sensing data signal and/or the initialization voltage based on the sensing voltage control signal, and supply the changed sensing data signal and/or the changed initialization voltage to the pixel during the sensing period SP, at step S1010. The display device may receive a sensing value from the pixel at step S1020 and convert the analog sensing value to a digital sensing code at step S1030. Subsequently, when the digital sensing code is not within the preset range with the maximum sensing code or the minimum sensing code (in the case of NO), the display device may generate compensated image data by reflecting the digital sensing code in input image data at step S1070 without generating a sensing voltage control signal.

Thus, according to some embodiments, the display device may detect the sensing value and control at least one of the sensing data signal or the initialization voltage, thereby securing a sensing voltage range within which to detect a sensing value even when characteristics of the driving transistor or characteristics of the light-emitting element is changed.

According to embodiments, a display device may detect a sensing value and control at least one of a sensing data signal or an initialization voltage, thereby securing a sensing voltage range in which to detect a sensing value even when characteristics of a driving transistor or characteristics of a light-emitting element is changed.

The characteristics of embodiments according to the present disclosure are not limited to what is described above, but there may be other various effects according to embodiments.

While various embodiments have been described above, those skilled in the art will appreciate that various modifications, additions and substitutions are possible, without departing from the scope and spirit.

Therefore, the embodiments disclosed in this specification are only for illustrative purposes, and should not be construed as limiting the embodiments according to the present disclosure, and the scope of embodiments according to the present disclosure may be defined by the accompanying claims, and their equivalents.

What is claimed is:

1. A display device comprising:

a plurality of pixels coupled to data lines and sensing lines;

a data driver configured to supply one of an image data signal and a sensing data signal to the data lines;

a voltage supply configured to supply an initialization voltage to the pixels through the sensing lines; and a sensing circuit configured to receive a sensing value from at least one of the pixels through the sensing lines, and compare the sensing value with a sensing reference value to generate a sensing voltage control signal to control at least one of the sensing data signal or the initialization voltage, the sensing voltage control signal comprising a first control signal to decrease at least one of the sensing data signal or the initialization voltage when the sensing value is greater than the sensing reference value, and a second control signal to increase at least one of the sensing data signal or the initialization voltage when the sensing value is less than the sensing reference value, wherein the voltage supply is configured to increase or decrease a level of the initialization voltage from a previous initialization voltage level according to the first control signal or the second control signal of the sensing voltage control signal to change a sensing voltage range for detecting the sensing value, and wherein the sensing voltage control signal is not supplied to the plurality of pixels.

2. The display device according to claim 1, wherein the sensing circuit comprises:

an analog-to-digital converter coupled to the sensing lines and configured to convert an analog sensing value provided through an input terminal to a digital sensing code.

3. The display device according to claim 2, wherein the sensing circuit further comprises:

a voltage comparator coupled to the input terminal of the analog-to-digital converter and configured to compare the analog sensing value with a sensing reference voltage to generate the sensing voltage control signal.

4. The display device according to claim 3, wherein the voltage comparator is configured to:

generate a first sensing voltage control signal in response to the analog sensing value being greater than the sensing reference voltage, and generate a second sensing voltage control signal in response to the analog sensing value being less than the sensing reference voltage.

5. The display device according to claim 4, further comprising:

a code comparator configured to receive the digital sensing code, and to compare the digital sensing code with a maximum sensing code or a minimum sensing code to generate the sensing voltage control signal based on a value of the comparing.

6. The display device according to claim 5, wherein the code comparator is configured to:

generate a first sensing voltage control signal in response to the value of the comparing between the digital sensing code and the maximum sensing code being less than a preset reference range, and generate a second sensing voltage control signal in response to the value of the comparing between the digital sensing code and the minimum sensing code being less than a preset reference range.

7. The display device according to claim 6, further comprising:

a timing controller configured to generate compensated image data by reflecting the digital sensing code in input image data, and to provide the compensated image data to the data driver.

8. The display device according to claim 7, wherein the code comparator is configured to compare the digital sensing code with the maximum sensing code or the minimum sensing code, and in response to the value of the comparing being out of a preset reference range, to provide the digital sensing code to the timing controller.

9. The display device according to claim 8, wherein the timing controller is configured to receive the sensing voltage control signal, to supply a signal to change the sensing data signal to the data driver based on the sensing voltage control signal, and to supply a signal to change the initialization voltage to the voltage supply based on the sensing voltage control signal.

10. The display device according to claim 1, wherein the pixels are coupled to scan lines and control lines, and wherein each of the pixels comprises:

a light-emitting element;

a first transistor including a gate electrode coupled to a first node, a first electrode coupled to a first driving voltage through a first power line, and a second electrode coupled to a first electrode of the light-emitting element;

a second transistor including a gate electrode coupled to one of the scan lines, a first electrode coupled to one of the data lines, and a second electrode coupled to the first node;

a third transistor including a gate electrode coupled to one of the control lines, a first electrode coupled to one of the sensing lines, and a second electrode coupled to the second electrode of the first transistor; and a storage capacitor coupled between the first node and the second electrode of the first transistor.

11. The display device according to claim 10, wherein:

the first transistor is a driving transistor, and a scan signal is supplied to the one of the scan lines and a control signal is supplied to the one of the control lines during a display period.

12. A display device comprising:

a plurality of pixels coupled to data lines and sensing lines;

a data driver configured to supply one of an image data signal and a sensing data signal to the data lines;

a voltage supply configured to supply an initialization voltage to the pixels through the sensing lines; and a sensing circuit configured to receive an analog sensing value from at least one of the pixels through the sensing lines, to convert the analog sensing value to a digital sensing code reflecting a difference between the analog sensing value and the initialization voltage, to compare the digital sensing code with a maximum sensing code or a minimum sensing code to generate a sensing voltage control signal to control at least one of the sensing data signal or the initialization voltage based on a value of the comparing, wherein the voltage supply is configured to increase or decrease a level of the initialization voltage from a previous initialization voltage level according to the sensing voltage control signal to widen a sensing voltage range for detecting the analog sensing value, and wherein the sensing voltage control signal is not supplied to the plurality of pixels.

13. The display device according to claim 12, wherein the sensing circuit is configured to:

generate a first sensing voltage control signal in response to the value of the comparing between the digital sensing code and the maximum sensing code being less than a preset reference range, and generate a second sensing voltage control signal in response to the value of the comparing between the digital sensing code and the minimum sensing code being less than a preset reference range.

14. The display device according to claim 13, further comprising:

a timing controller configured to generate compensated image data by reflecting the digital sensing code in input image data, and to provide the compensated image data to the data driver.

15. The display device according to claim 14, wherein the sensing circuit is configured to compare the digital sensing code with the maximum sensing code or the minimum sensing code, and in response to the value of the comparing being out of a preset reference range, to provide the digital sensing code to the timing controller.

16. The display device according to claim 15, wherein the timing controller is configured to receive the sensing voltage control signal, to supply a signal to change the sensing data signal to the data driver based on the sensing voltage control signal, and to supply a signal to change the initialization voltage to the voltage supply based on the sensing voltage control signal.

17. A method of driving a display device including a plurality of pixels coupled to data lines and sensing lines and driven to have a display period for displaying an image and a sensing period for sensing characteristics of a driving transistor included in each of the pixels, the method comprising:

supplying a sensing data signal to the data lines and an initialization voltage to the sensing lines in the sensing period;

receiving an analog sensing value from at least one of the pixels through the sensing lines; and comparing the analog sensing value with a sensing reference voltage to generate a sensing voltage control signal to control at least one of the sensing data signal or the initialization voltage, the sensing voltage control signal comprising a first control signal to decrease at least one of the sensing data signal or the initialization voltage when the analog sensing value is greater than the sensing reference voltage, and a second control signal to increase at least one of the sensing data signal or the initialization voltage when the analog sensing value is less than the sensing reference voltage, wherein a level of the initialization voltage is increased or decreased from a previous initialization voltage level according to the first control signal or the second control signal of the sensing voltage control signal to change a sensing voltage range between the sensing data signal and the initialization voltage for detecting the analog sensing value during the sensing period, and wherein the sensing voltage control signal is not supplied to the plurality of pixels.

18. The method according to claim 17, wherein generating the sensing voltage control signal comprises:

generating a first sensing voltage control signal in response to the analog sensing value being greater than the sensing reference voltage, and generating a second sensing voltage control signal in response to the analog sensing value being less than the sensing reference voltage.

19. The method according to claim 18, further comprising:

receiving the analog sensing value and converting the analog sensing value to a digital sensing code.

20. The method according to claim 19, further comprising:

receiving the digital sensing code, and comparing the digital sensing code with a maximum sensing code or a minimum sensing code to generate the sensing voltage control signal based on a value of the comparing.

* * * * *